(12) United States Patent
Warrington et al.

(10) Patent No.: US 12,022,086 B2
(45) Date of Patent: Jun. 25, 2024

(54) CONTENT-ADAPTIVE ENCODER CONFIGURATION

(71) Applicant: Synamedia Vividtec Holdings, Inc., Lawrenceville, GA (US)

(72) Inventors: Stephen Warrington, Waterloo (CA); Christopher Richard Warrington, Waterloo (CA); Lin Zheng, Waterloo (CA)

(73) Assignee: SYNAMEDIA VIVIDTEC HOLDINGS, INC., Lawrenceville, GA (US)

( * ) Notice: Subject to any disclaimer, the term of this patent is extended or adjusted under 35 U.S.C. 154(b) by 24 days.

(21) Appl. No.: 17/895,024

(22) Filed: Aug. 24, 2022

(65) Prior Publication Data

US 2024/0073423 A1    Feb. 29, 2024

(51) Int. Cl.
*H04N 19/137* (2014.01)
*H04N 19/103* (2014.01)
*H04N 19/172* (2014.01)
*H04N 19/85* (2014.01)

(52) U.S. Cl.
CPC ......... *H04N 19/137* (2014.11); *H04N 19/103* (2014.11); *H04N 19/172* (2014.11); *H04N 19/85* (2014.11)

(58) Field of Classification Search
CPC .. H04N 19/137; H04N 19/103; H04N 19/172; H04N 19/85
See application file for complete search history.

(56) References Cited

U.S. PATENT DOCUMENTS

| | | | | |
|---|---|---|---|---|
| 10,419,773 | B1* | 9/2019 | Wei | H04N 19/46 |
| 10,638,135 | B1* | 4/2020 | Wei | H04N 19/119 |
| 2006/0222078 | A1* | 10/2006 | Raveendran | H04N 19/137 |
| | | | | 375/E7.122 |
| 2007/0074266 | A1* | 3/2007 | Raveendran | H04N 19/172 |
| | | | | 725/94 |
| 2011/0170782 | A1* | 7/2011 | Iwamoto | H04N 19/14 |
| | | | | 382/190 |
| 2020/0288149 | A1* | 9/2020 | Mao | H04N 19/176 |
| 2022/0030247 | A1* | 1/2022 | Olekas | H04N 19/154 |

* cited by examiner

*Primary Examiner* — Mohammed S Rahaman
(74) *Attorney, Agent, or Firm* — Fernando & Partners, LLP

(57) ABSTRACT

Techniques for content-adaptive encoder configuration are described herein. In accordance with various embodiments, a device (e.g., a content-based toolset configurator) including a processor and a non-transitory memory receives one or more frames in a media stream and a performance target of an encoder. The content-based toolset configurator performs cycles of pre-analysis of the one or more frames to generate content features within the performance target, assigns a content class to the one or more frames based on the content features, a previous classification, and the performance target, and sets configurations of the encoder for encoding the one or more frames corresponding to the content class and the performance target.

19 Claims, 8 Drawing Sheets

300A

Sample Content Features and Content Classes

| Feature | Soccer Games | Content Class News | Cartoon |
|---|---|---|---|
| | | News | |
| Texture / Activity | High (crowd) / Low (field) | Moderate | Low |
| Motion | High | Low | Moderate |
| Text Crawl Presence | Yes (limited) | Yes (many) | No |

Sample Content Feature, Throttle and Content Classes

| Feature | Throttle | Previous Class | Assigned Class |
|---|---|---|---|
| Motion | Low | News | High Motion Estimation Accuracy Soccer Game |
| | High | News | Medium Motion Estimation Accuracy Soccer Game |

Figure 3B

Sample Toolset Map by Content Class and Throttle Level

| Toolset Accuracy | Throttle | Content Class | | |
|---|---|---|---|---|
| | | Soccer Games | News | Cartoon |
| Motion Estimation | Low | High | Medium | High |
| | Medium | High | Low | Medium |
| | High | Medium | Low | Low |
| Background/Grass Detection | Low | High | Low | Low |
| | Medium | High | Off | Low |
| | High | Medium | Off | Off |
| Face/Object Detection | Low | High | High | Off |
| | Medium | High | High | Off |
| | High | Medium | Medium | Off |

CONTENT-ADAPTIVE ENCODER CONFIGURATION

TECHNICAL FIELD

The present disclosure relates generally to media content encoding and, more specifically, to content-adaptive encoder feature selection.

BACKGROUND

Many media content encoding processes attempt to improve encoding performance, e.g., by applying presets to reduce the computing power when encoding a video, at the expense of reducing compression efficiency of the encoder. Presets are typically based on finding a set of tool restrictions that balance the tradeoff between performance and compression quality in an average sense. For example, when a given preset is mapped to a specific set of encoding tool selections and restrictions, that set of tool selections and restrictions are often applied to any type of video content. Even though the tool selections and restrictions may give different performance-compression tradeoffs in different classes of content, using the presets gives approximately the right performance-compression tradeoff when looking across a wide variety of content with an average view. Such an approach has the disadvantage of not optimizing the tool selection and restrictions to provide a precise performance-compression tradeoff for specific content being encoded.

Presets sometimes are also related to tuning encoder parameters for certain types of media content, known as tune modes. For example, many open-source encoders allow manual selection of toolset by the user based on the type of content. However, such solutions require the user to know beforehand what type of content would be encoded and select the appropriate tune mode. Such manual selection may not be useful to the user and may also not be practical for many encoding applications. For example, in real-time broadcast video encoding, a channel may switch between classes of video content throughout the day or play commercials at times. As such, the traditional preset-and-tune approach cannot automate the process of content class detection and optimizing toolset configuration.

BRIEF DESCRIPTION OF THE DRAWINGS

So that the present disclosure can be understood by those of ordinary skill in the art, a more detailed description may be had by reference to aspects of some illustrative embodiments, some of which are shown in the accompanying drawings.

FIG. 3A is a table illustrating exemplary mappings between content features and content class, in accordance with some embodiments;

FIG. 3B is a table illustrating exemplary content class labeling based at least in part on throttle configuration, in accordance with some embodiments;

FIG. 5 is a table illustrating exemplary mappings between the toolset configuration, the throttle configuration, and the content class, in accordance with some embodiments;

Figure 1:
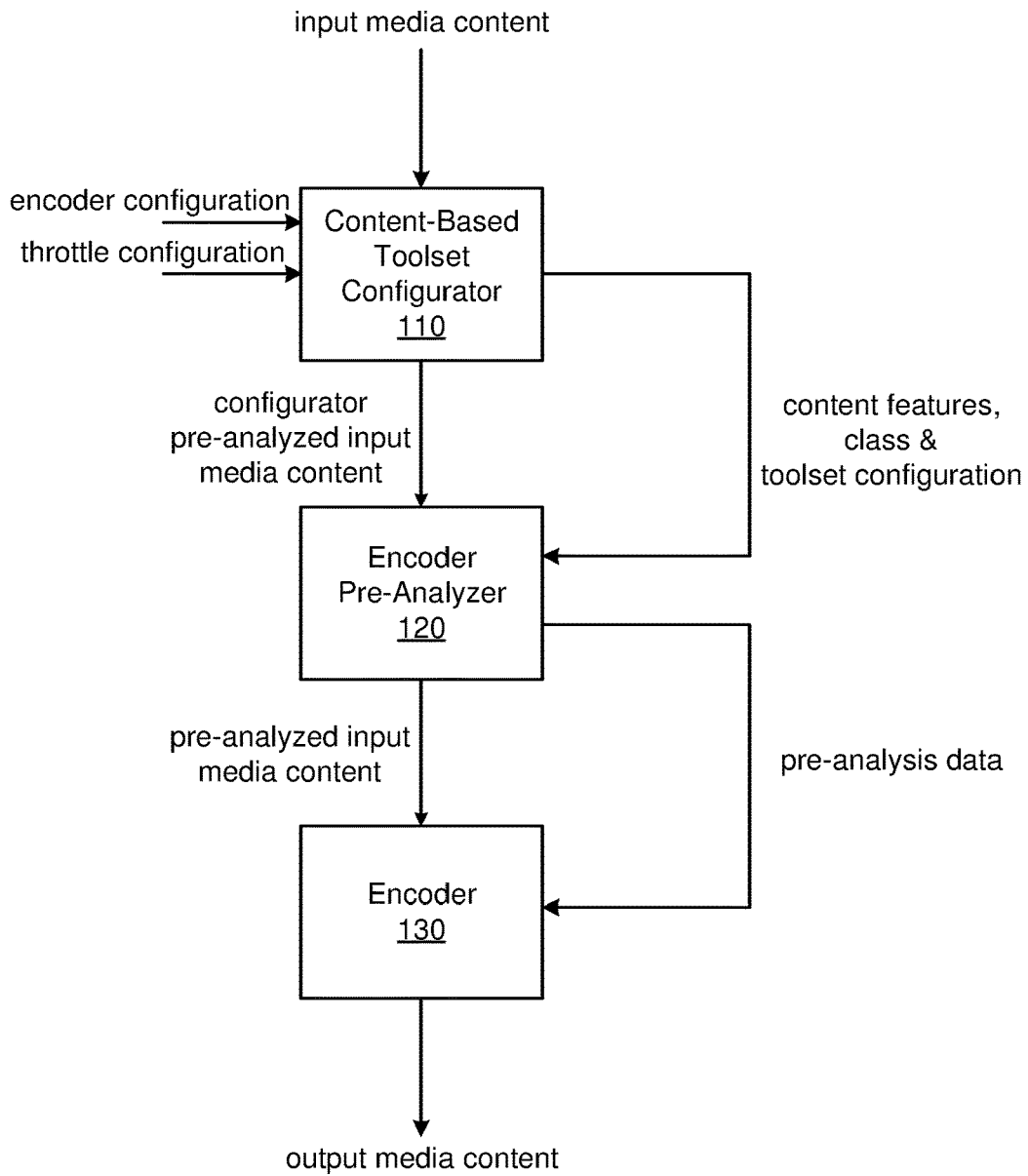
FIG. 1 is a block diagram of an exemplary adaptive media content view reporting, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DESCRIPTION OF EXAMPLE EMBODIMENTS

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example embodiments described herein.

Overview

Methods, devices, and systems described herein add a pre-analysis phase to categorize the type or class of media content to be encoded. The tool selection process is optimized such that the encoding tools are customized to the specific content class. As such, content-specific toolset maps can be derived where the same performance is achieved using content-specific toolset configurations. The pre-analysis combined with the optimized tool selection described herein thus allows for a more accurate performance-compression tradeoff across a variety of media content. The dynamic approach as described herein becomes important as new encoders add more toolsets for encoding. Because many tools are expensive to enable (e.g., in terms of encoder performance) and benefit the encoding of some content classes, pre-classifying the content and adaptively selecting when to apply certain tools provide the best encoder compression quality for the desired performance level.

In accordance with various embodiments, a content-based encoder toolset configuration method is performed at a device including a processor and a non-transitory memory. The method includes receiving one or more frames in a media stream and a performance target of an encoder. The method further includes performing cycles of pre-analysis of the one or more frames to generate content features within the performance target. The method also includes assigning a content class to the one or more frames based on the content features, a previous classification, and the performance target. The method additionally includes setting configurations of the encoder for encoding the one or more frames corresponding to the content class and the performance target.

Example Embodiments

As described above, previously existing methods of having the user select the desired performance level (e.g., preset) with an optional content-specific tool adaptation (e.g., tune) are unsuitable for many encoding applications where dynamic changes are expected in content type over time. Using real-time broadcast video encoding as an example, a channel may switch between different content classes multiple times during a day. Also as described above, although the tune modes are seen as independent of the performance presets, the toolset changes caused by the content tune modes can impact the encoder cycle, thus affecting encoder performance. As such, traditional preset-and-tune approaches face challenges such as classifier performance, automated identification of encoding classes, and adaptive mapping of content class and performance level to toolset selection. In contrast, content-adaptive encoder configuration methods, devices, and systems address the aforementioned issues and optimize the encoder performance in at least the following aspects.

First, to address the classifier performance issue, the adaptive configuration methods described herein determine which pre-analysis features are required for the rest of the encoding process and use the already-required features inside the content classifier to minimize the performance impact from the classification process. The performance cost of the automatic classification engine is important when evaluating the performance of the encoding system as a whole. Thus, it is important to minimize the performance cost of the classifier. Using encoding features in content classification during pre-analysis minimizes the content classifier performance overhead.

Second, to address the automated encoding class identification issue, the adaptive configuration methods described herein apply machine learning to classify content for the purposes of configuring encoding parameters. Although machine learning in general is well known, the adaptive configuration methods described herein apply machine learning to further determine how specific toolset performance varies on a specific content class. As such, machine learning is applied in the context of configuring encoding parameters for specific adaptation of an encoder to optimize the performance for encoding a specific content class.

Third, the adaptive configuration methods described herein develop a mapping to preset based on both content class and desired performance level, thus transforming the traditional one-dimensional preset concept into a multi-dimensional problem-solving approach, where tools are adaptively throttled out in a content-optimized way when higher performance is desirable. To enable the multi-dimensional approach, the relative importance of different toolsets to both the cycle performance and the compression quality of the encoder are analyzed to establish the mapping.

For example, legacy codecs (e.g., MPEG-2 or H.264 codec) have a relatively limited set of tools compared to more recent codecs (e.g., HEVC, AV1, or VVC codec). In particular, upcoming codecs (e.g., VVC) have a vast number of tools, some of which require substantial cycle costs to provide a compression benefit in specific types of content. These upcoming codecs also have a substantially higher cycle performance burden than legacy codecs, i.e., they take more cycles to encode the same amount of video. Thus, the additional cycle requirement of pre-classifying the video becomes more attractive on newer codecs both in terms of it being less of a relative cycle cost compared to the rest of the encoder, and providing more possible benefit because of the wider array of tools available.

Accordingly, the content-adaptive encoder configuration methods, devices, and systems go beyond the scope of previous solutions in that the automatic content classification is combined with a toolset selection based on both the content class and a desired encoder performance level. Consequently, the content-adaptive encoder configuration can achieve a more precise control on encoder performance across a wide variety of content classes to optimize the encoder performance. In some embodiments, the adaptive configuration uses automatic content classification for tool selection, thus allowing more precise performance control in encoding media content with dynamic content changes. Further, the content-specific toolset configuration mapping provides a specific performance-vs-compression tradeoff, where the view of performance preset and content tune mode are combined to achieve more accurate performance control. In some embodiments, the adaptive configuration seeks to derive content-specific toolset maps where the same performance is achieved using content-specific toolset configurations. Generating the consistent encoder performance control across a wide set of content types goes beyond prior solutions.

Reference is now made to FIG. 1, which is a block diagram illustrating an exemplary adaptive media content encoding system 100 in accordance with some embodiments. In some embodiments, the exemplary media content encoding system 100 includes a content-based toolset configurator 110 that receives input media content (e.g., unencoded content or content that has been encoded in a first format), an encoder pre-analyzer 120, and an encoder 130 that generates encoded content (e.g., including content encoded from raw content and/or re-encoded content in a second format). As used herein, the media content also referred to as multimedia content or content includes video, audio, and/or text, etc.

In some embodiments, the inputs to the content-based toolset configurator 110 are input media content (e.g., a video stream), the configuration information about the encoder 130 (e.g., any fixed configuration that is applicable to each content type, such as latency, bitrate, and/or resolution, etc.), and presets or throttle level (e.g., the desired performance target). In some embodiments, the encoder configuration information also includes the features used by the encoder pre-analyzer 120. Upon processing the inputs, the content-based toolset configurator 110 provides content features (e.g., statistics), content classification, and toolset configuration to the encoder pre-analyzer 120.

Once the content-based toolset configurator 110 analyzes the input media content, the encoder pre-analyzer 120, e.g., coupled to the encoder 130 and/or part of the encoder 130, performs its own analysis of the configurator pre-analyzed input media content and utilizes the content features, content classification, and the toolset configuration received from the content-based toolset configurator 110 for the pre-analysis. The encoder pre-analyzer 120 then provides pre-analysis data to the encoder 130. As such, in some embodiments, the pre-analysis data provided to the encoder 130 include content features, content classification, as well as toolset configuration, among others. The encoder 130 then encodes the pre-analyzed input media content based on settings specified in the pre-analysis data.

As described above, the fixed preset-and-tune approaches have certain limitations. Presets are designed to give good computational requirements with compression trade-offs in average media content, rather than being optimized for specific types of media content. Tunes on the other hand, are applied as fixed configuration changes, i.e., they enforce fixed changes on the toolset rather than being adapted to the current preset and/or throttle level. As such, the tune modes require knowing the content type during encoder configuration, and applying the same encoder configuration for any given media content following the tune setting. In practice, the fixed tune approach often does not allow for dynamic content-based toolset adjustments without a restart of the encoder.

The content-adaptive encoding system 100 addresses the aforementioned issues by adding the concept of content-based dynamic toolset configuration. In FIG. 1, the roles of the content-based toolset configurator 110 are to identify the type of the media content, e.g., content classes, and subsequently choose the appropriate set of encoder tools to achieve an optimal trade-off between computational requirements and compression efficiency for a specific content class. The encoder 130 can then use the toolset configuration outputted by the content-based toolset configurator 110 when compressing the current portion of the input media content.

In some embodiments, the encoder 130 also uses other information in the pre-analysis data, e.g., content features and classifications, for producing the output media content. For instance, the content classification (also referred to as the content type), can be useful for optimizing the rate control of the encoder 130, e.g., both in distributing bits within the frame and across multiple frames, or otherwise helpful for modifying the behaviors of the encoder 130 in ways beyond the toolset selection. In another example, the content features, e.g., statistics, are generated to facilitate content classification. In some embodiments, the encoder 130 uses the content features for its internal mode decision. Thus, exporting the content features to the encoder 130 helps optimize the computational requirements of the content-adaptive toolset selection system 100.

It should be noted that components are represented in the exemplary adaptive media content encoding system 100 for illustrative purposes. Other configurations can be used and/or included in the exemplary system 100. For example, the content-based toolset configurator 110, the encoder pre-analyzer 120, and the encoder 130 can be integrated, e.g., on the one or more devices, or distinct, e.g., on separate devices and/or servers. As such, various features of implementations described herein with reference to FIG. 1 can be embodied in a wide variety of forms, and that any specific structure and/or function described herein is illustrative.

Figure 2:
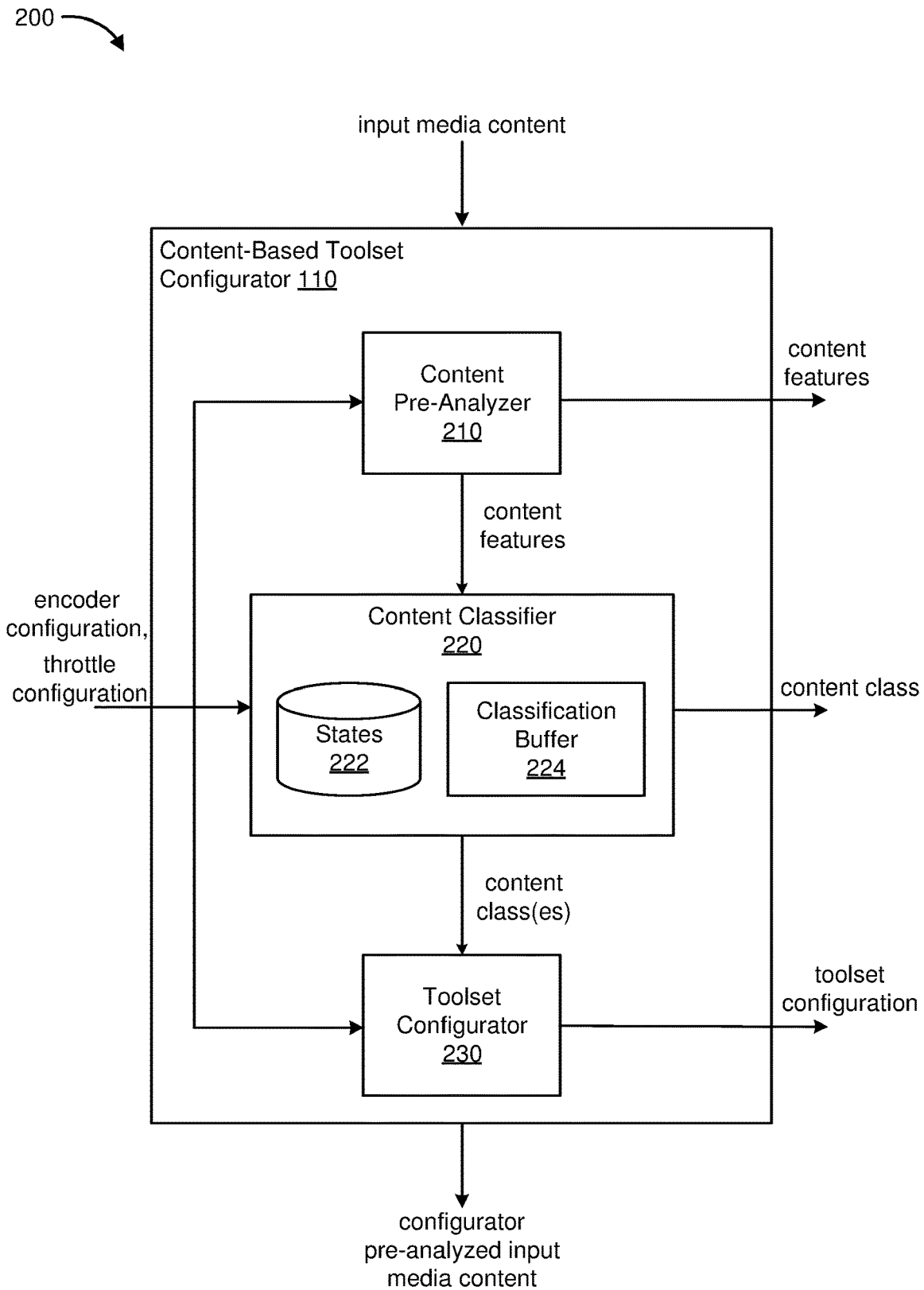
FIG. 2 is a diagram illustrating an exemplary content-based toolset configurator, in accordance with some embodiments.

FIG. 2 is a diagram 200 illustrating an exemplary embodiment of the content-based toolset configurator 110 in accordance with some embodiments. In some embodiments, the content-based toolset configurator 110 includes a content pre-analyzer 210, a content classifier 220, and a toolset configurator 230. In some embodiments, the content pre-analyzer 210 identifies content features of the input media content (e.g., an incoming video); the content classifier assigns a content class to the input media content; and the toolset configurator 230 provides the toolset configuration.

As described above with reference to FIG. 1, the role of the content-adaptive codec configuration system 100 is to identify encoder settings that provide the best computation and compression trade-off for content encoding. The content features derived by the content pre-analyzer 210 include (but are not restricted to) measures of texture indicating any activity or variance, content tags indicating the presence of logos or banners, grass, skin, or other identifying features, contrast or saturation (e.g., the maximum and minimum of luma, chroma DC levels within the picture, and/or histograms representations), the amount of noise within a respective frame, scene change, flash and fade detection, motion (e.g., initial estimates on the amount of motion within a respective frame and/or the detection of stationary parts in a respective frame), and/or the history (e.g., the frequency and/or regularity of scene changes, flashes, fades, and/or motion, etc.).

In some embodiments, the content pre-analyzer 210 controls the resource consumption for pre-analysis to avoid outweighing the potential gains from the pre-analysis. In some embodiments, the content pre-analyzer 210 favors using features that would be required for the encoder's own pre-analysis conducted by the encoder pre-analyzer 120 (FIG. 1), e.g., identifying features used by the encoder pre-analyzer from the encoder configuration information received by the content pre-analyzer. By choosing features that would be used by the encoder's pre-analysis, the content pre-analyzer 210 does not incur additional computational burden in the generation of such features.

In some embodiments, to further control the computational cost of the content pre-analysis by the content pre-analyzer 210, the content pre-analyzer 210 receives the desired throttle level as an input and adjusts the cycle of the content pre-analysis accordingly. As used herein, a high throttle configuration indicates high density (low compute) and low compression quality, while low throttle indicates low density but high compression quality. At high throttle levels, it is desirable to save cycles from the pre-analysis feature generation to lower the computational cost of its content pre-analysis in accordance with some embodiments. In some embodiments, to save cycles, the content pre-analyzer 210 disables some portions of the content pre-analysis or degrades some portions of the pre-analysis.

Having derived the features, in some embodiments, the content classifier 220 assigns a content class, e.g., specifying a class label, to the input media content using the features generated by the content pre-analyzer 210, classification state(s) stored in a datastore 222 as identified by previous iterations of the content classifier 220, and the throttle configuration among other information. Using such information, in some embodiments, the content classifier 220 maps the features provided by the content pre-analyzer 210 into specific content classes. It should be noted that the content pre-analyzer 210 and the content classifier 220 can use any suitable feature extraction, machine learning, and/or classification techniques. The content classes are selected based on finding specific types of content where a different toolset trade-off from default can provide some compression quality or cycle benefit. It should be further noted that the content classifier 220 can label the media content with a single class label or a set of class labels. Labeling the media content with multiple class labels is useful for determining more complex combinations of toolset configurations. For example, rather than labeling the media content with a single class label such as "soccer", labeling the media content with multiple labels such as "high motion", "logo detection important", "grass detection important", etc. allows more granular control over the selection of toolset configurations.

For example, FIG. 3A is a table 300A illustrating exemplary mappings between the features provided by the content pre-analyzer 210 (FIG. 2) and the content classes assigned by the content classifier 220 (FIG. 2). In FIG. 3A, the content classifier 220 (FIG. 2) analyzes attributes of features (e.g., texture and activity, motion, and text crawl presence) derived from the media content and determines to which class label to assign. For example, some media content has both high and low texture and activity (e.g., high when showing the crowd and low when showing the soccer field), high motion, and limited text crawl presence. The content classifier 220 (FIG. 2) assigns such media content to "soccer games" class. In another example, some media content has moderate texture and activity, low motion, and a higher text crawl presence. The content classifier 220 (FIG. 2) assigns such media content to "news" class. In yet another example, some media content has low texture and activity, moderation motion, and no text crawl presence. Accordingly, the content classifier 220 (FIG. 2) assigns such media content to "cartoon" class. As will be described in further detail below, different classes are mapped to different toolset configurations. As such, using a specific toolset configuration deviating from the default to encode soccer games, news, or cartoon would provide some compression quality or cycle benefit.

Referring back to FIG. 2, in some embodiments, the content classifier 220 maintains classification state information in the datastore 222, e.g., making classification of upcoming frames based on classification of past frames. As used herein, the terms "state", "class", "class label", "content type", and "type" are used interchangeably. Maintaining the state information provides consistency when configuring the encoder based on the content classification. In some embodiments, the content classifier 220 receives the throttle level as an input when assigning content classes, e.g., the throttling restrictions applied in the content pre-analysis by the content pre-analyzer 210 and/or the pre-set throttle level. Using the throttling information, the content classifier 220 restricts certain classes or class transitions depending on the throttling state.

For example, FIG. 3B is a table 300B illustrating exemplary content class labeling based at least in part on throttle configuration. In some embodiments, the throttle level affects the class labeling, which further controls the toolset configuration, e.g., the degree of motion estimation, etc. In FIG. 3B, when the previous class assignment was "news", when the throttle level is low, the switching from the content class "news", which has low motion value as shown in FIG. 3A, to the content class "high motion estimation accuracy soccer game" is less restrictive, i.e., assigning the current frame to the class "high motion estimation accuracy soccer game" following assigning the previous frame to the class "news". In contrast, when the throttle level is high, the content classifier can restrict the assignment of the class label to the upcoming frame, e.g., assigning the current frame to the class "medium motion estimation accuracy soccer game" following assigning the previous frame to the class "news" so that the performance of adaptive encoding is within the performance target.

Referring back to FIG. 2, maintaining the state information in the datastore 222 also reduces toolset switching artifacts. Overly-frequent changes in toolset configurations can result in a degradation in the overall media content quality due to varying mode decisions by differing toolsets. In some embodiments, the content classifier 220 smooths or dampens the toggling between different content class labels through intermedia content states. For example, one set of toolset configurations applies to content with high noise, and another set of toolset configurations applies to content with low noise. In some embodiments, the content classifier 220 adds an intermediate class label (e.g., medium noise) that maps to an intermediate toolset configuration between the sets of configurations used for high and low noise. In such embodiments, the content classifier 220 further restricts the transitioning of the content class from low to medium and then to high or vice versa, rather than allowing direct transitioning between low and high. This scheme can also be extended to allow multiple intermediate classes in accordance with various embodiments.

Figure 4B:
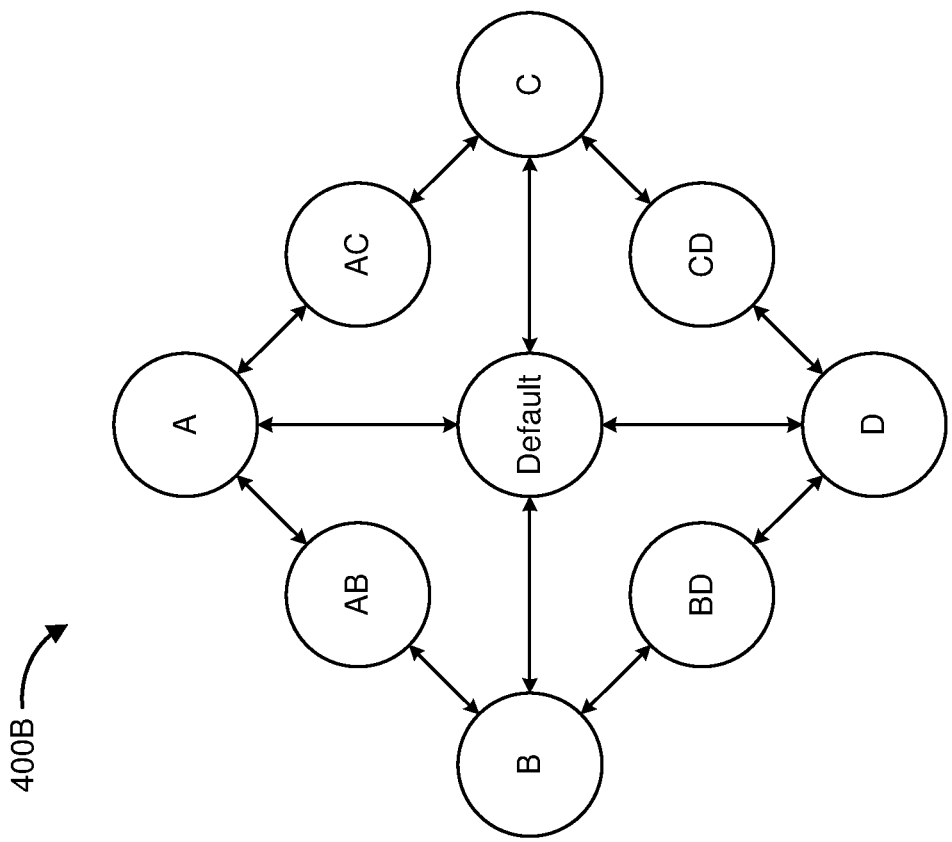
FIGS. 4A and 4B are exemplary state diagrams illustrating class transitioning, in accordance with some embodiments.
Figure 4A:
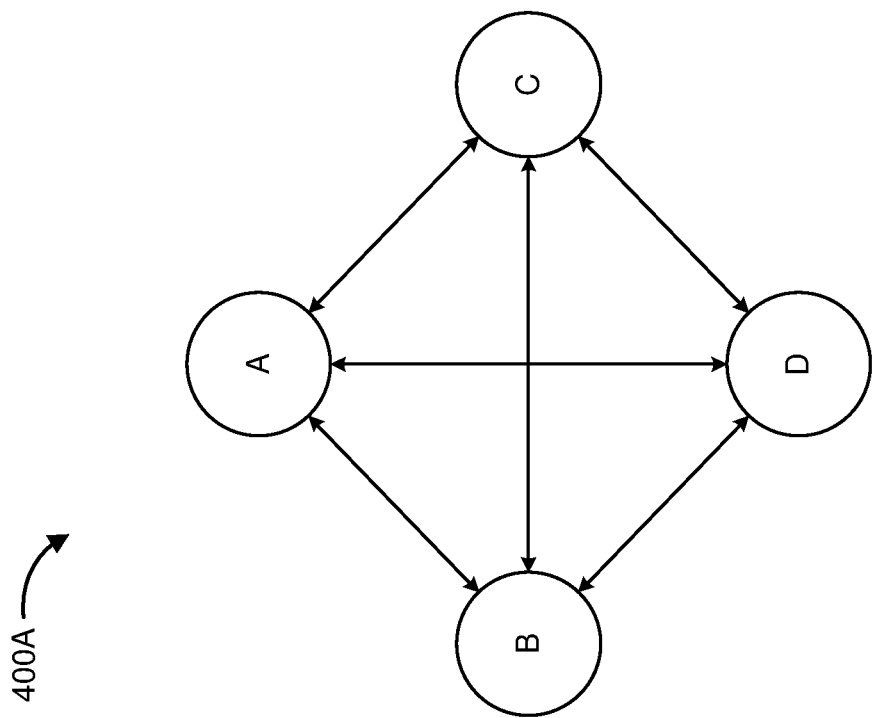

For example, FIG. 4A is an exemplary state diagram 400A incorporating four states. In FIG. 4A, the encoder can transition between any of the four classes, e.g., between (A, B, C, D). In another example, FIG. 4B is an exemplary state diagram 400B incorporating intermediate classes and a default class. In FIG. 4B, any class can transition to the default class and vice versa. In some embodiments, the default class is mapped to a pre-determined default set of encoder toolset configurations that works well in general without requiring a specific content class label to be applied. As such, having the default class is useful when a specific content class label cannot be determined. Also different from the state transitions in FIG. 4A, in FIG. 4B, the content classifier 220 (FIG. 2) restricts some class transitions, e.g., any transition from a class to another class without going through the default state goes through an intermediate stage, e.g., one of (AB, AC, BD, or CD). Adding such intermediate classes smooths some of the effects of transitioning between toolsets when classes change.

Referring back to FIG. 2, in some embodiments, the content classifier 220 also includes a delay stage or a content classification buffer 224 to accumulate a portion of the media content, e.g., a plurality of upcoming frames. As such, the content classifier 220 can examine features of the buffered portion of the media content to improve the confidence in the content class label to be assigned on an upcoming frame. Consequently, the content classifier 220 smooths or dampens the toggling between different content class labels by switching when the confidence of a new content class label is above a threshold. In some embodiments, the buffer 224 is also necessary for certain types of content class labeling, e.g., for improving the accuracy of scene change, fade, or camera flash detection. In other words, the content classifier 220 introduces the delay introduced in state changes so that the content pre-analysis features are strongly in favor of the new state prior to a transition to avoid excessive toggling between two states, especially when the feature values are near a state boundary. The specific trade-off between content class labeling accuracy and latency cost varies and depends on specific system requirements.

Having classified the media content, in some embodiments, the toolset configurator 230 configures the tools to be used in the encoder 130 (FIG. 1) based on the content class labels from the content classifier 220 as well as the history of toolset configurations. In some embodiments, using the content class provided by the previous classification step, the toolset configurator 230 makes toolset selections that are more targeted to the specific content class. Examples of toolset selections include content-based selection of types of motion search and motion compensation, filtering, the detection and handling of certain specific types of content such as flashes, fades, logos, text crawls, sports field/patch handling, etc. Similar to the smooth state transition in the content classifier 220, in some embodiments, the toolset configurator 230 provides encoding parameters so that the values are transitioned in a gradual way to smooth toolset configurations changes at the encoder, e.g., gradual transition of the search range, mode decision thresholds, and/or filter strengths. On the other hand, in some embodiments, the toolset configurator 230 allows for a sudden change in the toolset configuration at strong content discontinuities. For example, gradual toolset changes can happen within a scene, while a sudden discontinuity may be allowed at scene changes.

As shown in FIG. 2, the toolset configurator 230 also receives the encoder configuration as an input in some embodiments, since the specific set of tools to be used (and at what levels and/or strength levels) is dependent on the encoder type. As different tools are present in different encoder and/or encoding processes, and sometimes in different configurations, the performance-vs-compression trade-off varies by encoder. Accordingly, the map of toolset configuration to desired performance level also varies by encoder. For example, different content-specific mappings can apply when configuring the encoder to maximize a specific objective metric such as PSNR, VMAF, SSIM, etc. to allow the encoder to operate in a mode optimized towards the specific objective metric.

In addition to receiving the encoder configuration, in some embodiments, the toolset configurator 230 also receives the throttle configuration as an input. Depending on the throttle level, in some embodiments, the content class is mapped to various toolset configuration settings. For example, as described in the example shown in FIG. 3A, cartoon content has moderate motion. As a result, as shown in FIG. 5, which is a table 500 illustrating exemplary mappings between the toolset configuration, the throttle configuration, and the content class, when the throttle level is medium, the toolset configurator 230 (FIG. 2) maps the content class "cartoon" to medium motion estimation configuration. In contrast, when the throttle level is low, the toolset configurator 230 (FIG. 2) maps the content class "cartoon" to a high motion estimation encoder setting to obtain higher quality motion estimation. On the other hand, when the throttle level is high, the toolset configurator 230 (FIG. 2) maps the content class "cartoon" to a low motion estimation encoder setting to conserve computational resources. In some cases, when the throttle level is medium or high, the toolset configurator 230 (FIG. 2) maps certain encoder configuration settings to off, e.g., setting the background and grass detection encoder settings to "off" for news.

Figure 6A:
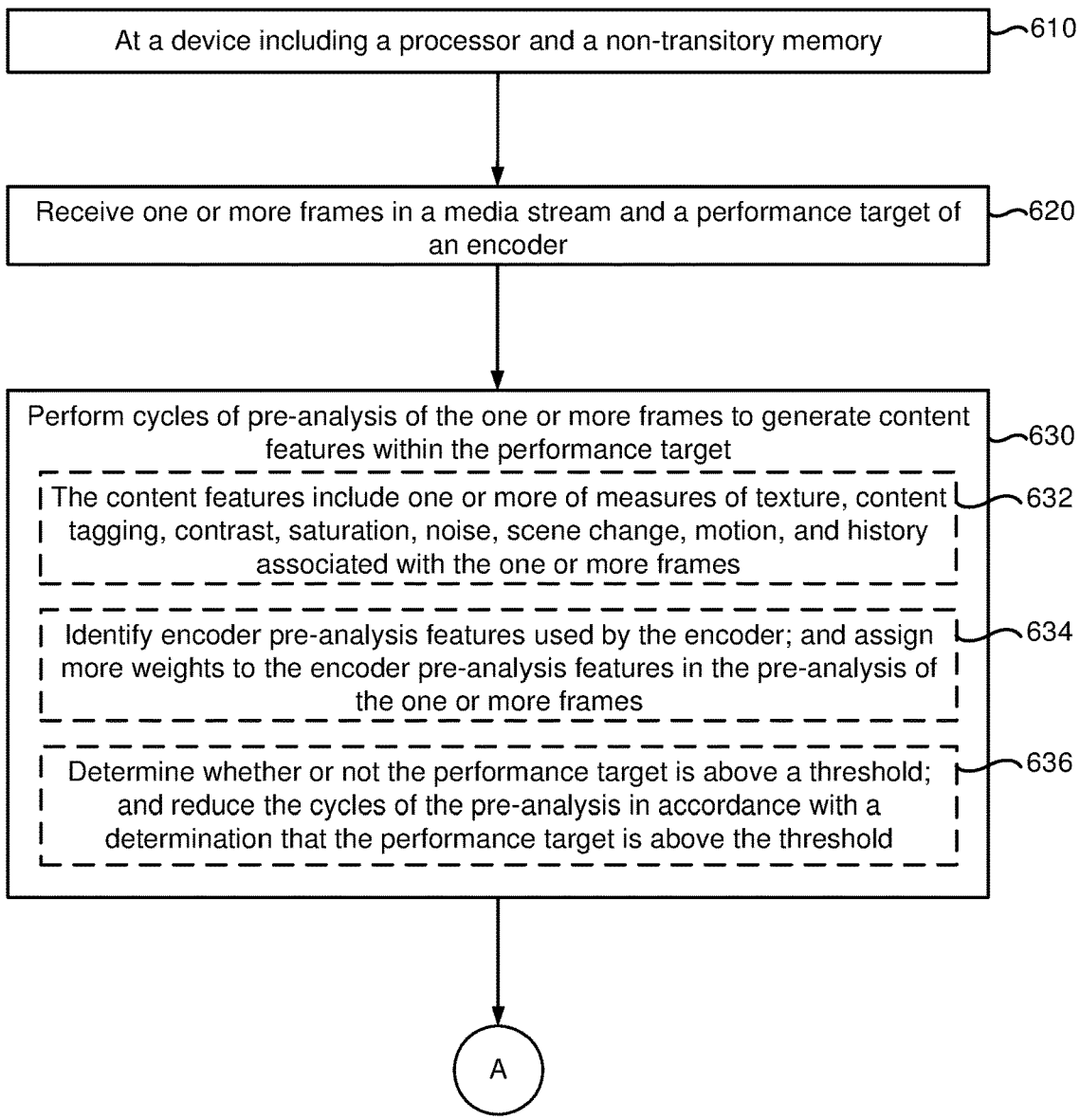
FIGS. 6A and 6B are flow diagrams illustrating a content-adaptive encoder configuration method, in accordance with some embodiments.
Figure 6B:
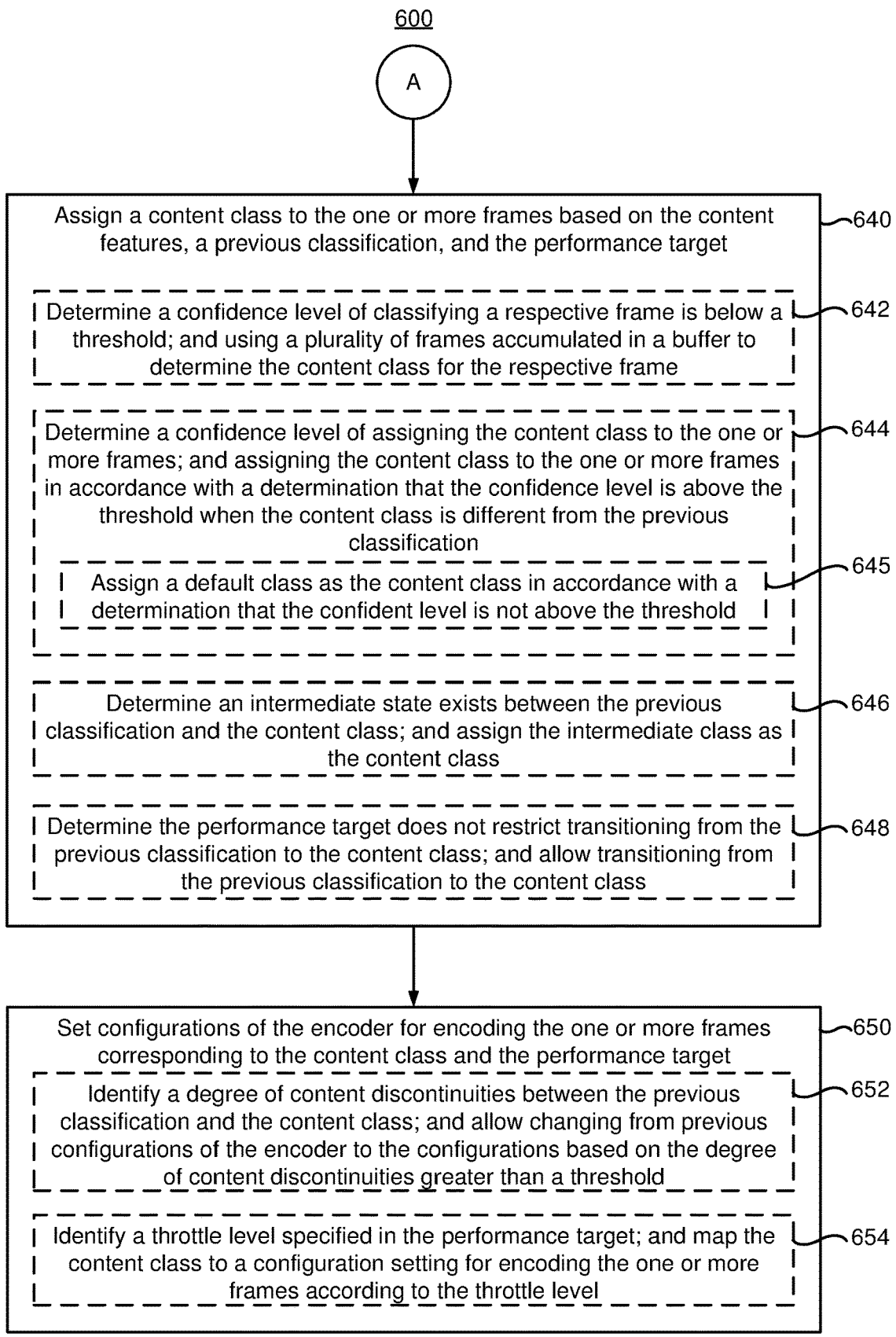

FIGS. 6A and 6B are flow diagrams illustrating a content-adaptive encoder configuration method 600 in accordance with some embodiments. As represented by block 610 in FIG. 6A, in some embodiments, the method 600 is performed at a device that includes a processor and a non-transitory memory, e.g., a device hosting the content-based toolset configurator 110 in FIG. 1. The method 600 begins with the content-based toolset configurator receiving one or more frames in a media stream and a performance target of an encoder as represented by block 620. The method 600 continues, as represented by block 630, with the content-based toolset configurator (e.g., the content-pre-analyzer 210 in FIG. 2) performing cycles of pre-analysis of the one or more frames to generate content features within the performance target.

In some embodiments, as represented by block 632, the content features include one or more of measures of texture (e.g., activity or variance), content tagging (e.g., presence of logos or banners), contrast, saturation (e.g., maximum and minimum of luma and/or chroma DC levels within the picture), noise (the amount of noise within a respective frame), scene change (e.g., based on flash and fade detection), motion (e.g., the initial estimates on the amount of motion within a respective frame), and history associated with the one or more frames (e.g., frequency of scene changes, flashes, fades, and/or how regularly there is motion).

In some embodiments, as represented by block 634, performing the one or more cycles of the pre-analysis of the one or more frames to generate the content features includes identifying encoder pre-analysis features used by the encoder, and assigning more weights to the encoder pre-analysis features in the pre-analysis of the one or more frames. For example, as shown in FIG. 1, the content-based toolset configurator 110 receives from the encoder pre-analyzer 120 features that are used by the encoder pre-analysis and favors using such features in the content pre-analysis, e.g., assigning more weights to such features. Favoring the encoder pre-analysis features helps lower the computational cost of the pre-analysis and by choosing features that would be used by the encoder's pre-analysis, the content-based toolset configurator does not incur any additional computational burden in the generation of the features.

In some embodiments, as represented by block 636, performing the cycles of the pre-analysis of the one or more frames to generate the content features within the performance target includes determining whether or not the performance target is above a threshold, and reducing the cycles of the pre-analysis in accordance with a determination that the performance target is above the threshold. As such, the generation of content pre-analysis features is aware of the desired throttle level so that the content pre-analyzer 210 (FIG. 2) saves cycles from pre-analysis at high throttle levels, or even disables some portions of the pre-analysis and/or degrades some portions of the pre-analysis at throttle levels.

Turning to FIG. 6B, the method 600 continues with the content classifier 220 (FIG. 2) of the content-based toolset configurator 110 assigning a content class to the one or more frames based on the content features, a previous classification, and the performance target as represented by block 640. In some embodiments, as represented by block 642, assigning the content class to the one or more frames based on the content features, the previous classification, and the performance target includes determining that a confidence level of classifying a respective frame is below a threshold, and using a plurality of frames accumulated in a buffer to determine the content class for the respective frame. For example, in FIG. 2, the classification buffer (and/or a delay stage) allows the content classifier 220 to gain more confidence on the content class label to be assigned on an upcoming frame by examining the buffered features on other upcoming frames.

In some embodiments, as represented by block 644, assigning the content class to the one or more frames based on the content features, the previous classification, and the performance target includes determining a confidence level of assigning the content class to the one or more frames, and assigning the content class to the one or more frames in accordance with a determination that the confidence level is above the threshold when the content class is different from the previous classification. For example, as shown in FIG. 2, the content classifier 220 maintains classification state information in the datastore 222. Also as shown in FIG. 5A, the content classifier 220 uses the state information when determining a classification of upcoming frames, e.g., based at least in part on classification of past frames to allow the transitioning among states (A, B, C, D) when the confidence level of assigning the content class label is above a threshold. Further, to provide a consistency in encoder configuration based on the content classification and to dampen the effect of encoding quality degradation due to configuration switches, the content classifier 220 (FIG. 2) assigns a new content class when there is confidence that a new content class label applies. On the other hand, in some embodiments, as represented by block 645, the method 600 further includes assigning a default class as the content class in accordance with a determination that the confident level is not above the threshold. For example, in FIG. 4B, the default class label can be assigned and transitioned to from any previously assigned class when specific content class label cannot be determined with sufficient confidence.

In some embodiments, as represented by block 646, assigning the content class to the one or more frames based on the content features, the previous classification, and the performance target includes determining an intermediate state exists between the previous classification and the content class, and assigning the intermediate class as the content class. For example, in FIG. 4B, intermediate states (AB, AC, BC, and CD) are added to reduce toolset switching artifacts. When such intermediate states exist, switching among (A, B, C, D) is through the intermediate steps to avoid excessive toggling between two states.

In some embodiments, as represented by block 648, assigning the content class to the one or more frames based on the content features, the previous classification, and the performance target includes determining the performance target does not restrict transitioning from the previous classification to the content class, and allowing transitioning from the previous classification to the content class. For example, as shown in FIG. 2, the content classifier 220 receives the throttle configuration as an input and uses the information in assigning a content class or to restrict certain classes or class transitions depending on the throttle information. In the example shown in FIG. 3B, when the throttle level specified in the performance target is low, the content classifier 220 (FIG. 2) does not restrict the assigning of the content class label "soccer games" when switching from a previous content class label "news", even though the motion feature value for news content is low and the motion feature value for soccer games is high. On the other hand, when the throttle level specified in the performance target is high, the content classifier 220 (FIG. 2) restricts the assigning of the content class label "high motion accuracy soccer game" when switching from "news" and assigns an intermediate class label instead, e.g., "medium motion estimation soccer game" as shown in FIG. 3B.

Still referring to FIG. 6B, the method 600 continues, with the content-based toolset configurator (e.g., the toolset configurator 230, FIG. 2) setting configurations of the encoder for encoding the one or more frames corresponding to the content class and the performance target as represented by block 650. In some embodiments, as represented by block 652, setting the configurations of the encoder for encoding the one or more frames corresponding to the content class and the performance target includes identifying a degree of content discontinuities between the previous classification and the content class, and allowing changing from previous configurations of the encoder to the configurations based on the degree of content discontinuities greater than a threshold, e.g., allowing a sudden discontinuity at scene changes.

In some embodiments, as represented by block 654, setting the configurations of the encoder for encoding the one or more frames corresponding to the content class and the performance target includes identifying a throttle level specified in the performance target, and mapping the content class to a configuration setting for encoding the one or more frames according to the throttle level. For example, in the example shown in FIG. 5, for content class "cartoon", the encoder motion estimation is high when the throttle level is low, while the encoder motion estimation is medium when the throttle level is medium, the encoder motion estimation is low when the throttle level is high. Also as shown in FIG. 5, the same desired performance target results in different tool configurations depending on the assigned content class, e.g., high motion estimation for "soccer", low for "news", and medium for "cartoon" when the throttle level is medium.

Figure 7:
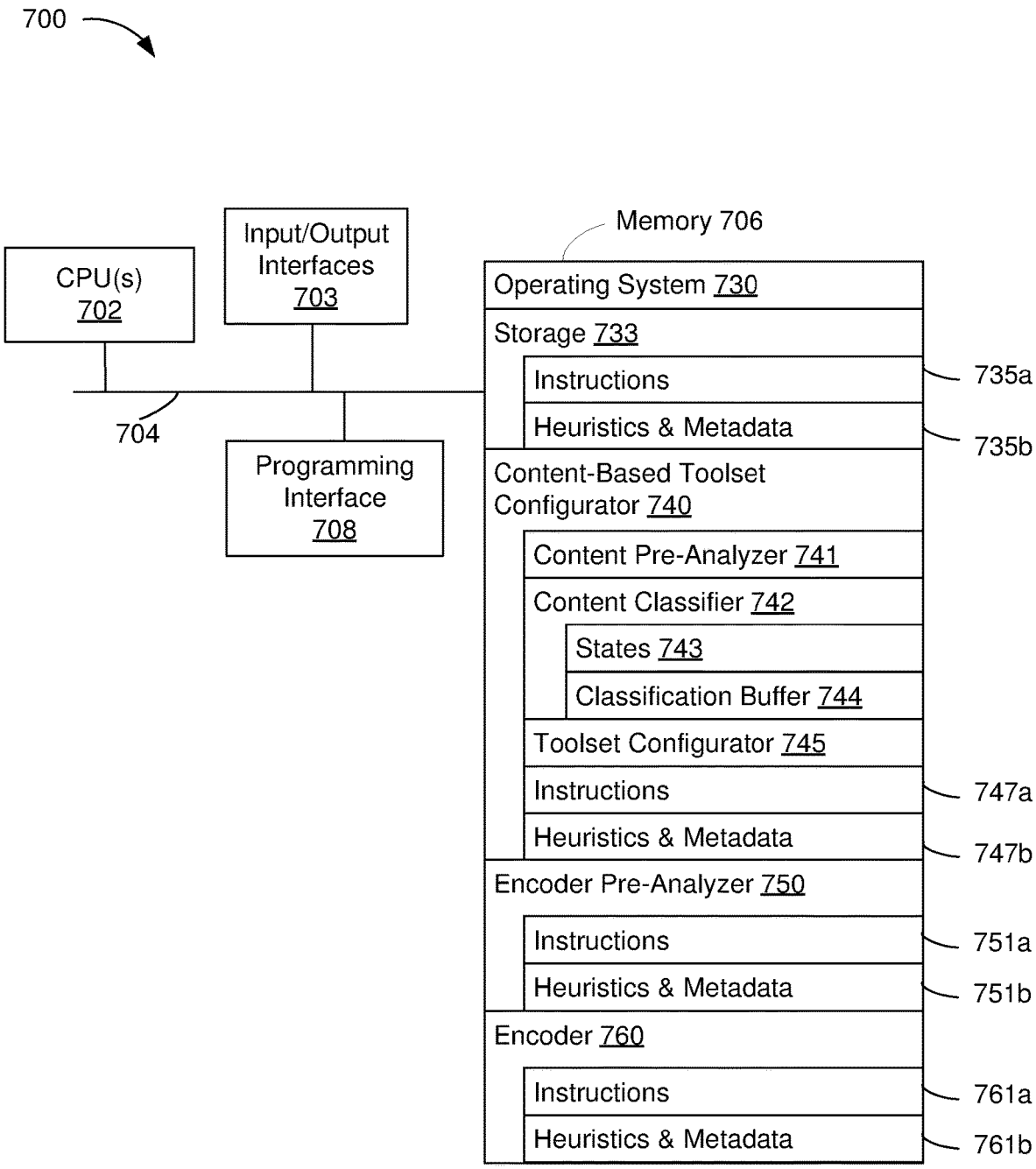
FIG. 7 is a block diagram of a computing device for content-adaptive encoder configuration, in accordance with some embodiments.

FIG. 7 is a block diagram of a computing device 700 for content-adaptive encoder configuration in accordance with some embodiments. In some embodiments, the computing device 700 performs one or more functions of one or more server side devices hosting the content-based toolset configurator 110, the encoder pre-analyzer 120, and/or the encoder 130 in FIG. 1, and performs one or more of the functionalities described above with respect to the server(s). While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 700 includes one or more processing units (CPUs) 702 (e.g., processors), one or more input/output interfaces 703 (e.g., input devices, sensors, a network interface, a display, etc.), a memory 706, a programming interface 708, and one or more communication buses 704 for interconnecting these and various other components.

In some embodiments, the communication buses 704 include circuitry that interconnects and controls communications between system components. The memory 706 includes high-speed random access memory, such as DRAM, SRAM, DDR RAM or other random access solid state memory devices; and, in some embodiments, include non-volatile memory, such as one or more magnetic disk storage devices, optical disk storage devices, flash memory devices, or other non-volatile solid state storage devices. The memory 706 optionally includes one or more storage devices remotely located from the CPU(s) 702. The memory 706 comprises a non-transitory computer readable storage medium. Moreover, in some embodiments, the memory 706 or the non-transitory computer readable storage medium of the memory 706 stores the following programs, modules and data structures, or a subset thereof including an optional operating system 730, a storage module 733, a content-based toolset configurator 740, an encoder pre-analyzer 750, and an encoder 760. In some embodiments, one or more instructions are included in a combination of logic and non-transitory memory. The operating system 730 includes procedures for handling various basic system services and for performing hardware dependent tasks.

In some embodiments, the storage module 733 stores data related to content-adaptive encoder configuration data as well as media content for content delivery. To that end, the storage module 733 includes a set of instructions 735*a* and heuristics and metadata 735*b*.

In some embodiments, the content-based toolset configurator 740 (e.g., the content-based toolset configurator 110 in FIGS. 1 and 2) is configured to analyze and classify content within the encoder configuration and throttle configuration in order to generate content-adaptive encoder configuration. In some embodiments, the content-based toolset configurator 740 further includes a content pre-analyzer 741 (e.g., the content pre-analyzer 210 in FIG. 2) for performing content feature extraction, a content classifier 742 (e.g., the content classifier 220) for classifying the content using the content features, and a toolset configurator 745 (e.g., the toolset configurator 230 in FIG. 2) for generating toolset configurations based on the content class(es). In some embodiments, for classifying the content, the content classifier 742 further includes a datastore 743 (e.g., the states datastore 222 in FIG. 2) for storing states information and a classification buffer 744 (e.g., the classification buffer 224 in FIG. 2) for accumulating media content in order to improve the confidence level of a new content class assignment. To that end, the content-based toolset configurator 740 includes a set of instructions 747a and heuristics and metadata 747b.

In some embodiments, the encoder pre-analyzer 750 (e.g., the encoder pre-analyzer 120 in FIG. 1) is configured to use the content features, class(es), and toolset configuration parameters generated by the content-based toolset configurator 740 to perform pre-analysis for the encoder 760. To that end, the encoder pre-analyzer 750 includes a set of instructions 751a and heuristics and metadata 751b.

In some embodiments, the encoder 760 (e.g., the encoder 130 in FIG. 1) is configured to encode the media content using the pre-analysis data from the content-based toolset 740 and the encoder pre-analyzer 750. To that end, the encoder 760 includes a set of instructions 761a and heuristics and metadata 761b.

Although the storage module 733, the content-based toolset configurator 740, the encoder pre-analyzer 750, and the encoder 760 are illustrated as residing on a single computing device 700, it should be understood that in other embodiments, any combination of the storage module 733, the content-based toolset configurator 740, the encoder pre-analyzer 750, and the encoder 760 can reside on a separate computing device. For example, in some embodiments, each of the storage module 733, the content-based toolset configurator 740, the encoder pre-analyzer 750, and the encoder 760 resides on a separate computing device to form a system. In another example, the content-based toolset configurator 740 can be coupled to the encoder pre-analyzer 750 as shown in FIG. 1 or coupled to the encoder 760 directly when the encoder pre-analyzer 750 is coupled to and/or a part of the encoder 760.

Moreover, FIG. 7 is intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIG. 7 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first device could be termed a second device, and, similarly, a second device could be termed a first device, which changing the meaning of the description, so long as all occurrences of the "first device" are renamed consistently and all occurrences of the "second device" are renamed consistently. The first device and the second device are both devices, but they are not the same device.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method comprising:
at a device including a processor and a non-transitory memory:
receiving one or more frames in a media stream and a performance target of an encoder;
performing cycles of pre-analysis of the one or more frames to generate content features within the performance target;
assigning a content class to the one or more frames based on the content features, a previous classification, and the performance target; and
setting configurations of the encoder for encoding the one or more frames corresponding to the content class and the performance target, including identifying a degree of content discontinuities between the previous classification and the content class, and allowing changing from previous configurations of the encoder to the configurations based on the degree of content discontinuities greater than a threshold.

2. The method of claim 1, wherein the content features include one or more of measures of texture, content tagging, contrast, saturation, noise, scene change, motion, and history associated with the one or more frames.

3. The method of claim 1, wherein performing the one or more cycles of the pre-analysis of the one or more frames to generate the content features includes:
identifying encoder pre-analysis features used by the encoder; and assigning more weights to the encoder pre-analysis features in the pre-analysis of the one or more frames.

4. The method of claim 1, wherein performing the cycles of the pre-analysis of the one or more frames to generate the content features within the performance target includes:
   determining whether or not the performance target is above a threshold; and
   reducing the cycles of the pre-analysis in accordance with a determination that the performance target is above the threshold.

5. The method of claim 1, wherein assigning the content class to the one or more frames based on the content features, the previous classification, and the performance target includes:
   determining a confidence level of classifying a respective frame is below a threshold; and
   using a plurality of frames accumulated in a buffer to determine the content class for the respective frame.

6. The method of claim 1, wherein assigning the content class to the one or more frames based on the content features, the previous classification, and the performance target includes:
   determining a confidence level of assigning the content class to the one or more frames; and
   assigning the content class to the one or more frames in accordance with a determination that the confidence level is above the threshold when the content class is different from the previous classification.

7. The method of claim 6, further comprising:
   assigning a default class as the content class in accordance with a determination that the confident level is not above the threshold.

8. The method of claim 1, wherein assigning the content class to the one or more frames based on the content features, the previous classification, and the performance target includes:
   determining an intermediate state exists between the previous classification and the content class; and
   assigning the intermediate class as the content class.

9. The method of claim 1, wherein assigning the content class to the one or more frames based on the content features, the previous classification, and the performance target includes:
   determining the performance target does not restrict transitioning from the previous classification to the content class; and
   allowing transitioning from the previous classification to the content class.

10. The method of claim 1, wherein setting the configurations of the encoder for encoding the one or more frames corresponding to the content class and the performance target includes:
    identifying a throttle level specified in the performance target; and
    mapping the content class to a configuration setting for encoding the one or more frames according to the throttle level.

11. A system comprising:
    an encoder with a performance target; and
    a content-based toolset configurator coupled to the encoder, including a content pre-analyzer, a content classifier, and a toolset configurator, wherein the content-based toolset configurator is configured to:
    receive one or more frames in a media stream and the performance target of the encoder;
    perform, by the content pre-analyzer of the toolset configurator, cycles of pre-analysis of the one or more frames to generate content features within the performance target;
    assign, by the content classifier of the toolset configurator, a content class to the one or more frames based on the content features, a previous classification, and the performance target; and
    set, by the toolset configurator of the content-based toolset configurator, configurations of the encoder for encoding the one or more frames corresponding to the content class and the performance target, including identifying a degree of content discontinuities between the previous classification and the content class, and allowing changing from previous configurations of the encoder to the configurations based on the degree of content discontinuities greater than a threshold.

12. The system of claim 11, wherein the content features include one or more of measures of texture, content tagging, contrast, saturation, noise, scene change, motion, and history associated with the one or more frames.

13. The system of claim 11, wherein performing, by the content pre-analyzer, the one or more cycles of the pre-analysis of the one or more frames to generate the content features includes:
    identifying, by the content pre-analyzer, encoder pre-analysis features used by the encoder; and
    assigning, by the content pre-analyzer, more weights to the encoder pre-analysis features in the pre-analysis of the one or more frames.

14. The system of claim 11, wherein performing, by the content pre-analyzer, the cycles of the pre-analysis of the one or more frames to generate the content features within the performance target includes:
    determining, by the content pre-analyzer, whether or not the performance target is above a threshold; and
    reducing, by the content pre-analyzer, the cycles of the pre-analysis in accordance with a determination that the performance target is above the threshold.

15. The system of claim 11, wherein assigning, by the content classifier, the content class to the one or more frames based on the content features, the previous classification, and the performance target includes:
    determining, by the content classifier, a confidence level of classifying a respective frame is below a threshold; and
    using, by the content classifier, a plurality of frames accumulated in a buffer to determine the content class for the respective frame.

16. The system of claim 11, wherein assigning, by the content classifier, the content class to the one or more frames based on the content features, the previous classification, and the performance target includes:
    determining, by the content classifier, a confidence level of assigning the content class to the one or more frames; and
    assigning, by the content classifier, the content class to the one or more frames in accordance with a determination that the confidence level is above the threshold when the content class is different from the previous classification.

17. The system of claim 16, wherein the content classifier is further configured to:
    assign a default class as the content class in accordance with a determination that the confident level is not above the threshold.

18. The system of claim 11, wherein assigning, by the content classifier, the content class to the one or more frames based on the content features, the previous classification, and the performance target includes:
- determining an intermediate state exists between the previous classification and the content class; and
- assigning the intermediate class as the content class.

19. A non-transitory computer readable memory storing one or more programs, which, when executed by one or more processors of one or more devices, cause the one or more devices to:
- receive one or more frames in a media stream and a performance target of an encoder;
- perform cycles of pre-analysis of the one or more frames to generate content features within the performance target;
- assign a content class to the one or more frames based on the content features, a previous classification, and the performance target; and
- set configurations of the encoder for encoding the one or more frames corresponding to the content class and the performance target, including identifying a degree of content discontinuities between the previous classification and the content class, and allowing changing from previous configurations of the encoder to the configurations based on the degree of content discontinuities greater than a threshold.

* * * * *